United States Patent
Policicchio

(10) Patent No.: US 8,931,132 B2
(45) Date of Patent: *Jan. 13, 2015

(54) CLEANING ARTICLE WITH DIFFERENTIAL OVERLAP BETWEEN SHEET AND TOW FIBERS

(75) Inventor: Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/416,334

(22) Filed: Mar. 9, 2012

(65) Prior Publication Data

US 2013/0232710 A1    Sep. 12, 2013

(51) Int. Cl.
 *A47L 13/16* (2006.01)
 *A47L 13/38* (2006.01)

(52) U.S. Cl.
 CPC .............. *A47L 13/38* (2013.01); *B32B 2432/00* (2013.01)
 USPC ................................ 15/229.3; 15/226; 15/228

(58) Field of Classification Search
 USPC .......... 15/209.1, 231, 229.1–229.9, 208, 228, 15/226
 See application file for complete search history.

(56) References Cited

U.S. PATENT DOCUMENTS

| | | | |
|---|---|---|---|
| 823,725 A | 6/1906 | Hayden et al. | |
| 4,145,757 A | 3/1979 | Bonnie | |
| 4,506,404 A | 3/1985 | Clay | |
| 5,536,555 A | 7/1996 | Zelazoski et al. | |
| 5,953,784 A | 9/1999 | Suzuki et al. | |
| 6,513,184 B1 | 2/2003 | Brown et al. | |
| 6,550,092 B1 | 4/2003 | Brown et al. | |
| 6,813,801 B2 | 11/2004 | Tanaka et al. | |
| 6,963,591 B2 | 11/2005 | Tulloch et al. | |
| 6,984,615 B2 | 1/2006 | Kenmechi et al. | |
| 7,228,587 B2 | 6/2007 | Tanaka et al. | |
| 7,231,685 B2 | 6/2007 | Tanaka et al. | |
| 7,234,193 B2 | 6/2007 | Tanaka et al. | |
| 7,234,914 B2 | 6/2007 | Usab et al. | |
| 7,237,296 B2 | 7/2007 | Tanaka et al. | |
| 7,237,297 B2 | 7/2007 | Tanaka et al. | |
| 7,243,391 B2 | 7/2007 | Tanaka et al. | |

(Continued)

FOREIGN PATENT DOCUMENTS

| EP | 0945251 A1 | 9/1999 |
|---|---|---|
| EP | 1880652 A1 | 1/2008 |

(Continued)

OTHER PUBLICATIONS

U.S. Appl. No. 13/416,526, filed Mar. 9, 2012, Cooper.

(Continued)

*Primary Examiner* — Shay Karls
(74) *Attorney, Agent, or Firm* — Larry L. Huston; Steven W. Miller

(57) ABSTRACT

A cleaning article optionally removably attachable to a handle. The cleaning article has a layer of tow fibers and a layer of sheet material, joined together in a layered construction. The tow fiber layer has a greater width than the sheet, so that the tow fibers overhang the edge of the sheet. The amount of overhang varies throughout at least a portion of the length of the cleaning article. Such variation provides a differential overhang believed to promote fluffing of the tow fibers.

18 Claims, 6 Drawing Sheets

(56) References Cited

U.S. PATENT DOCUMENTS

| | | |
|---|---|---|
| 7,251,851 B2 | 8/2007 | Lin et al. |
| 7,302,729 B2 | 12/2007 | Tanaka et al. |
| 7,302,730 B2 | 12/2007 | Tanaka et al. |
| 7,334,287 B2 | 2/2008 | Tanaka et al. |
| 7,435,243 B2 | 10/2008 | Miyamoto |
| 7,566,671 B2 | 7/2009 | Hoadley et al. |
| 7,918,839 B2 | 4/2011 | Ehrnsperger et al. |
| 2004/0016074 A1 | 1/2004 | Tanaka |
| 2005/0198757 A1 | 9/2005 | Gavney, Jr. et al. |
| 2006/0016036 A1 | 1/2006 | Tanaka et al. |
| 2006/0101601 A1 | 5/2006 | Fujiwara |
| 2007/0033761 A1 | 2/2007 | Yang et al. |
| 2007/0084006 A1* | 4/2007 | Policicchio .................. 15/226 |
| 2009/0049633 A1* | 2/2009 | Takabayashi et al. ....... 15/209.1 |
| 2010/0154156 A1 | 6/2010 | Takabayashi et al. |
| 2010/0319152 A1 | 12/2010 | Pzizepasniak |
| 2011/0131746 A1 | 6/2011 | Policicchio et al. |
| 2011/0154598 A1 | 6/2011 | Yamada |

FOREIGN PATENT DOCUMENTS

| | | | |
|---|---|---|---|
| JP | 2009142358 A | | 7/2009 |
| JP | 2011-104111 A | | 6/2011 |
| JP | 2011104111 A | * | 6/2011 |

OTHER PUBLICATIONS

U.S. Appl. No. 13/416,486, filed Mar. 9, 2012, Policicchio.
U.S. Appl. No. 13/416,420, filed Mar. 9, 2012, Policicchio.
Intl. Search report, dtd Jul. 15, 2013, 11 Pages.

* cited by examiner

CLEANING ARTICLE WITH DIFFERENTIAL OVERLAP BETWEEN SHEET AND TOW FIBERS

FIELD OF THE INVENTION

The present invention relates to cleaning articles, and more particularly to cleaning articles comprising tow fibers and the like.

BACKGROUND OF THE INVENTION

Various cleaning articles have been created for dusting and light cleaning. For example, cloth rags and paper towels used dry or wetted with polishing and cleaning compositions have been used on relatively flat surfaces. But, rags and paper towels are problematic for reasons such as hygiene (the user's hand may touch chemicals, dirt or the surface during cleaning), reach (it may be difficult to insert the user's hand with the rag or paper towel into hard-to-reach places) and inconvenience (cleaning between closely-spaced articles typically requires moving the articles).

To overcome the problems associated with using rags and paper towels, various dust gathering devices having feathers, lamb's wool, and synthetic fiber brushes have been utilized for more than a century, as illustrated by U.S. Pat. No. 823, 725 issued in 1906 to Hayden. Such dust gathering devices can be expensive to manufacture, and as such are designed to be cleaned and reused. One problem associated with a reusable dust gathering device is that such dust gathering devices may not hold or trap dust very well. Soiled, reusable devices are typically cleaned via shaking or through other mechanical agitation. This process is not entirely satisfactory as it requires an extra step during, interrupting and/or following the cleaning process. Furthermore, the attempted restoration of the device may not be successful, allowing redeposition of the previously collected dust.

To address the problems experienced with reusable dust gathering devices, disposable dust gathering devices have been developed which have limited re-usability. These disposable dust gathering devices may include brush portions made of synthetic fiber bundles, called tow fibers, attached to a sheet as shown in 2010/0319152. Or the tow fibers may be attached to a plate as shown in U.S. Pat. No. 4,145,787. The disposable cleaning article may be used for one job (several square meters of surface) and discarded, or may be restored and re-used for more jobs, then discarded. Traditional cleaning articles including feather dusters, cloths, string mops, strip mops and the like, are not disposable for purposes of this invention.

Such devices may be made, for example, according to U.S. Pat. Nos. 6,813,801; 6,968,591; 6,984,615; 7,228,587; 7,231, 685; 7,234,193; 7,234,914; 7,237,296; 7,237,297; 7,243,391; 7,302,729; 7,302,730; and/or 7,334,287 (having a common related application). The patents in this linage have a common feature—strips laterally extending from both sides of a generally planar article. The strips serve the purpose of increasing surface area of intermediate tow fibers by promoting deformation of the tow fibers out of the plane of the article. This approach has the attendant problem that excessive material is used for the strips. If the strips have the same length, taken from the longitudinal axis, as the tow fibers, the strips can interfere with the tow fibers fully contacting the target surface.

Another problem with a cleaning article comprising strips is that such cleaning articles are typically packaged in a flat state. To get optimum performance, a user should pre-fluff the cleaning article prior to use. Even with instructions, many users simply do not understand how to correctly perform this step. Some users do not read the instructions and entirely skip this step. Furthermore, the strips can be partially joined together due to improper cutting during manufacture, making the fluffing insufficient or more difficult. The problem of strips in such cleaning articles is exacerbated in U.S. Pat. No. 5,953,784 which teaches strips extending not only from both sides of the cloth, but also from the front.

One attempt to overcome this problem is found in U.S. Pat. No. 7,566,671 which does not use laterally extending strips. However, this attempt has the drawback that the cleaning implement thereof only cleans on one side of the implement—not both sides as taught by the lineage of U.S. Pat. No. 6,813,801.

An attempt to overcome the single-sided cleaning disadvantage of the aforementioned U.S. Pat. No. 7,566,671 is found in U.S. Pat. No. 7,251,851 which teaches a spiral duster. However, this approach starts with a construction similar to that of the aforementioned U.S. Pat. No. 6,813,801 lineage and U.S. Pat. No. 823,725—leading the intended solution back to the same approach which started the problem 100 years ago.

Thus, there is a need for a cleaning article which does not require gather strips. Such cleaning article may further provide for advantageous use of the tow fibers to gather and retain dust and may also allow the user to minimize or eliminate the often overlooked or improperly performed fluffing step.

SUMMARY OF THE INVENTION

The invention comprises a cleaning article. The cleaning article is optionally removably attachable to a handle. The cleaning article comprises at least one layer of tow fibers and at least one sheet joined together in face to face relationship. At least some of the tow fibers overhang the edge of the sheet. The amount of the overlap is different throughout at least a portion of the longitudinal length of the cleaning article.

DETAILED DESCRIPTION OF THE INVENTION

Figure 1:
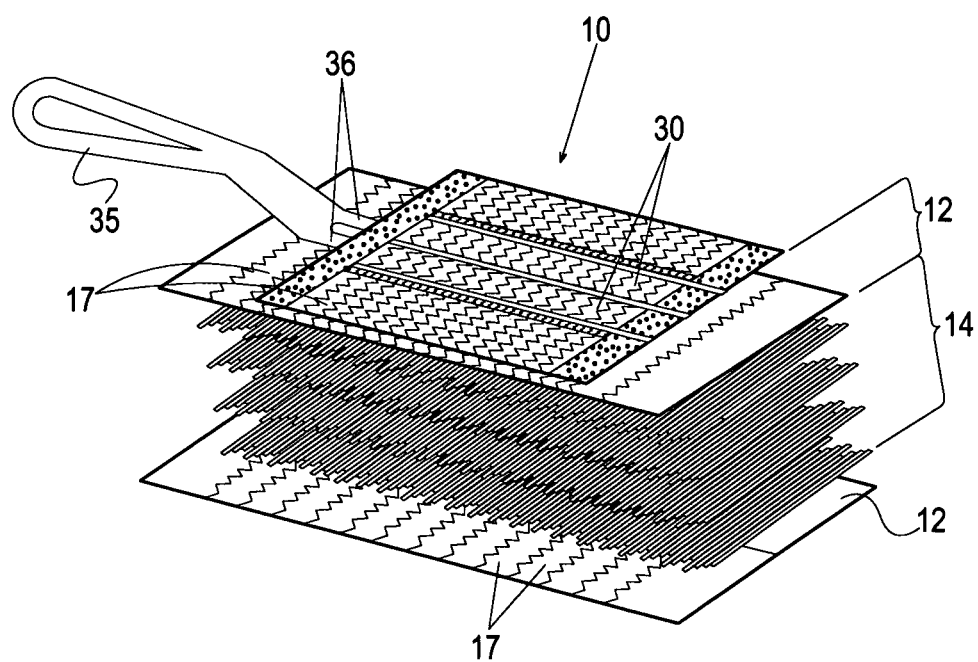
FIG. 1 is a schematic exploded perspective view of a cleaning article according to the prior art and having strips on two outer laminae.

Referring to FIG. 1, the cleaning article 10 may be generally elongate, having a longitudinal axis L, although other shapes are contemplated and feasible. The cleaning article 10 may be removably attachable to a handle 35 and/or may be used without a handle 35. A suitable handle 35 is disclosed in commonly assigned US Publication 2011/00099764.

The z-direction of the cleaning article 10 is the direction perpendicular to the sheet 12 which is typically closest to the handle 35 (if present) of the cleaning article 10, the XY plane is defined as the plane defined by the sheet 12 and is typically perpendicular to the z-direction. The cleaning article 10 may have a longitudinal axis L and a transverse axis T orthogonal thereto. The cleaning article 10, and respective components thereof, may have two longitudinal edges 20 parallel to the longitudinal axis L and two transverse edges 22 parallel to the transverse axis T.

The length of the cleaning article 10, etc. is taken in the longitudinal direction. The width of the cleaning article 10 corresponds to the transverse direction perpendicular to the length direction and disposed within the plane of the sheet 12. The thickness is defined as the dimension in the z-direction. The length and width of the strips shown in the art are taken in the transverse and longitudinal directions, respectively.

The cleaning article 10 may be thought of as having two, three or more laminae joined in face-to-face relationship. The laminae may comprise a tow fiber lamina 14, intermediate two laminae of generally planar sheets 12. Alternatively, a single tow fiber layer 14 may be joined to a single generally planar sheet 12. The tow fiber layer 14 is shown to comprise four layers, although one of skill will understand from one to several layers are feasible and contemplated for use with the present invention. Likewise, one, two, three or more sheets 12 are feasible and contemplated for use with the present invention.

An attachment system may provide for removable attachment of the cleaning article 10 to a suitable and optional handle 35. The cleaning article 10 attachment system and optional complementary handle 35 attachment may comprise adhesive joining, cohesive joining, mechanical engagement, etc. One common attachment system comprises sleeves 30 into which the tines 36 of the handle 35 may be inserted. The sleeves 30 may be disposed on an outer lamina 12.

The sheet 12 may have an outwardly facing preferential cleaning side and a second inwardly facing attachment side opposed thereto. The sheet 12 may comprise a nonwoven sheet 12. Suitable nonwovens may be made according to commonly assigned U.S. Pat. Nos. 6,797,357; 6,936,330, D489,537 and/or D499,887.

Adjacent the sheet 12 may be a compressible and/or deformable second lamina of fibers 14. The second lamina may comprise tow fibers 14. The tow fiber lamina 14 may be joined to the sheet 12 in face-to-face relationship. The tow fiber lamina 14 may be suitable for directly contacting the target surface during cleaning.

The tow fibers 14 may be synthetic. As used herein "bundle fibers" and/or "tow" refer to fibers comprising synthetic polymers including polyester, polypropylene, polyethylene and cellulose materials including cellulose acetate and mixtures thereof manufactured wherein the individual fibers are relatively long strands manufactured in bundles. The bundle fibers may be defined as any fibers having distinct end points and at least about 1 cm in length. The cleaning article 10 of the present invention may further comprise an optional absorbent core (not shown).

The sheet 12, fibrous layer 14 and non-planar structure 16 may be joined together by thermal bonding, autogenous bonding, ultrasonic bonding, heat sealing, adhesive and/or other means known in the art. The sheet 12 may comprise two plies, joined together in face-to-face relationship. The sheet 12, fibrous layer 14 and non-planar structure may be bonded in a pattern which provides a central spine 42 parallel the longitudinal axis L.

The joining of the tow fiber layer 14 and generally planar sheets 12 may be done with any combination of continuous bonds 38 and/or spot bonds 38, as known in the art. The bonds 38 may be used to create sleeves for an attachment system as known in the art and discussed herein.

The bonding pattern joining the two plies may be provided in a pattern which provides a sleeve 30 complementary to and able to receive the tines 36 of the handle 35, if used with the cleaning article 10 of the present invention. Particularly, the bonding may be provided in a pattern which is generally longitudinally oriented, so that the tines 36 may be inserted into the sleeve 30 created between adjacent bonds 38.

The bond pattern may provide a continuously bonded or discretely bonded central spine 42. Outboard of the central spine 42, the bond pattern may comprise one or more continuous or discontinuous bond sites. The space between the central spine 42 bond and the outboard bonds 38 may create a sleeve 30 for receiving a tine 36 of the optional handle 35. If desired, the sheet 12 may be shrunk/strained in the cross-direction. This process can provide rugosities or wrinkles in sheet 12. The rugosities/wrinkles space apart the plies of sheet 12, allowing for easier insertion of the tines 36 into the sleeve 30, if so desired.

Figure 2:
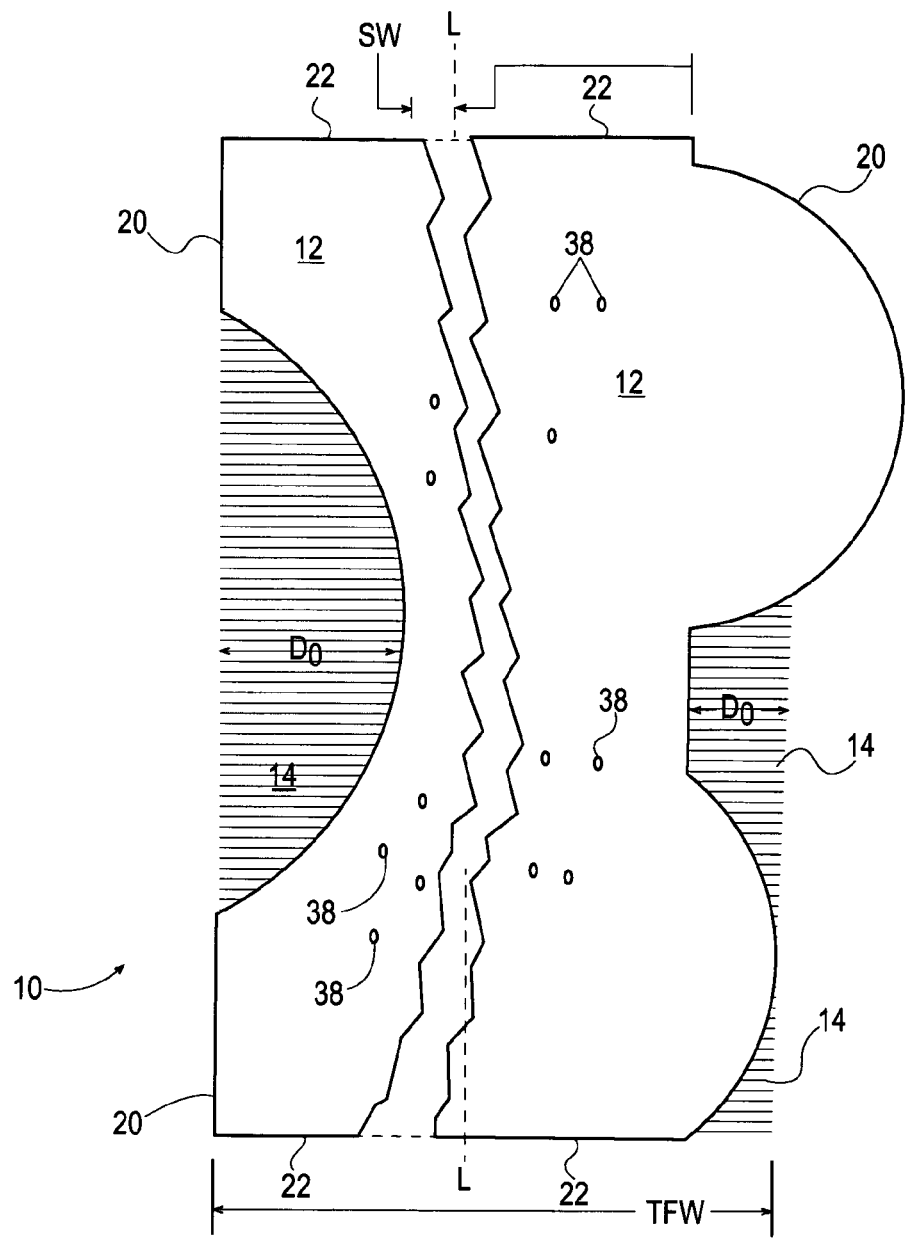
FIG. 2 is a broken schematic top plan view of a cleaning article according to the present invention and having a sheet with a concave notch on one side of the longitudinal axis L and having convex shapes on the other side of the longitudinal axis L.

Referring to FIG. 2, the cleaning article 10 according to the present invention for removable attachment to a handle 35 has a longitudinal axis L defining a longitudinal length. Again, the cleaning article 10 comprises at least one layer of tow fibers 14. The tow fibers extend transversely outward from proximal ends juxtaposed with said longitudinal axis L to distal ends laterally remote therefrom. The tow fiber layer 14 further has first and second opposed faces and defines a tow fiber width TFW. The tow fiber width TFW is the distance from the longitudinal axis L to the distal end of a particular tow fibers taken in a straight, planar and transverse direction. The tow fiber width TFW may be straight or variable throughout the longitudinal length.

The cleaning article 10 further comprises a generally planar sheet 12 disposed on a first face of the at least one layer of tow fibers 14. The sheet 12 having a sheet 12 width SW taken in a straight, planar and transverse direction. The sheet 12 width SW is being predominantly less than the tow fiber width TFW. The difference between sheet 12 width SW and tow fiber width TFW varies along a predominant portion of the longitudinal length of the cleaning article 10. This geometry is referred to herein as 'differential overhang DO.

Of course such differential overhang DO is relevant throughout the longitudinal length where there is coincidence between the sheet 12 and layer of tow fibers 14 and is controlled by the longitudinally shorter of these components. By predominantly, it is meant that the sheet 12 width SW is less than the tow fiber width TFW, throughout at least 50%, 75% or 100% of the longitudinal length of said sheet 12. However, a cleaning article 10 having a differential overhang DO throughout at least 10, 20, 30 or 40% of the longitudinal length is also contemplated.

Of course, if there are one or more sheets 12 interposed between plural layers of tow fibers 14, or vice versa, each sheet 12/tow fiber layer 14 will provide a different combination of sheet 12 width SW and tow fiber width TFW. Each such combination will provide a respective differential overhang DO therebetween. The differential overhang DO may be the same or different, as desired. Conversely, in one embodiment, the cleaning article 10 may be symmetric about the longitudinal axis L. If so the differential overhang DO of the tow fibers over the edge of the sheet 12 will be the same on both sides of the longitudinal centerline.

Figure 3:
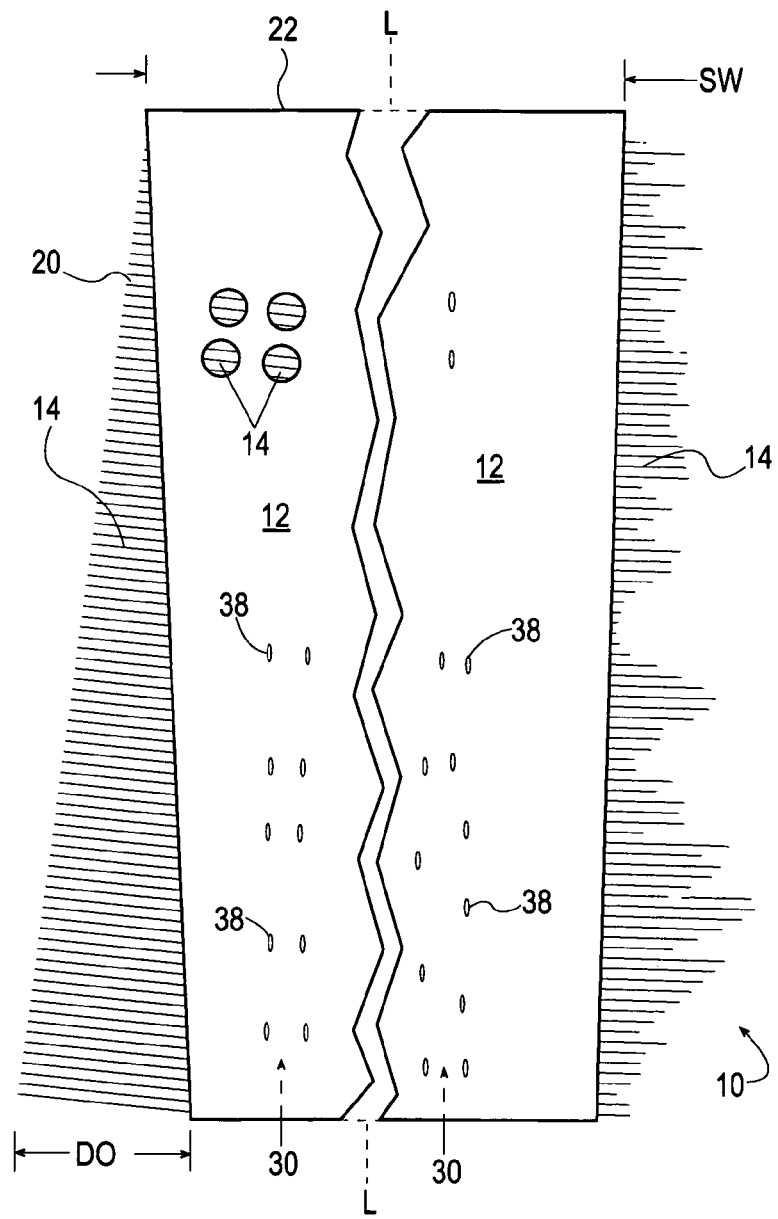
FIG. 3 is a broken schematic top plan view of a cleaning article according to the present invention and having a tow fiber layer which changes in density and monotonically changes in length on one side of the longitudinal axis and a random shape on the other side of the longitudinal axis L.

Referring to FIG. 3, if desired, each longitudinal edge of either and/or more sheets 12 may be notched to be concave, providing a sheet 12 referred to as concave. If the tow fiber layer 14 is of constant width, this arrangement provides a differential overhang DO which is relatively greater as the transverse axis T is approached and relatively lesser as either transverse edge is approached. This arrangement provides the advantage that the relatively greater differential overhang DO near the center of the cleaning article 10 may provide relatively greater fluffing of the tow fibers near the center of the cleaning article 10.

Figure 4:
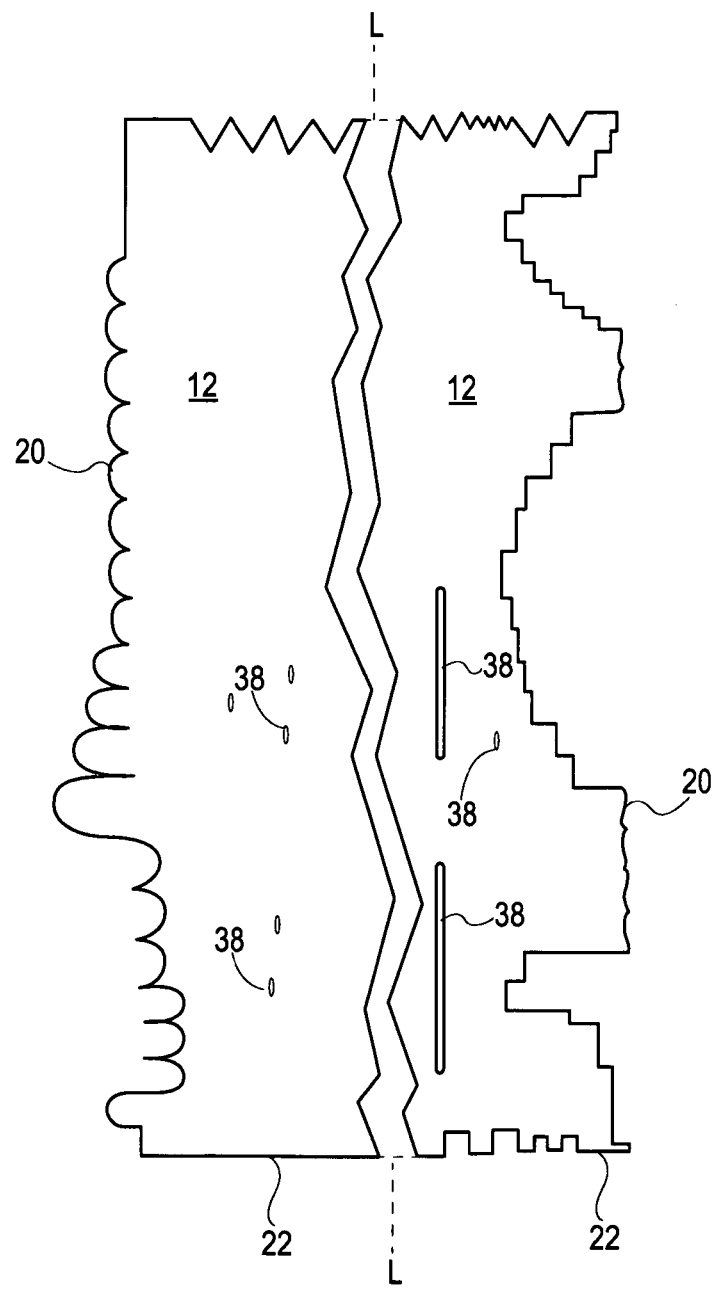
FIG. 4 is a broken top plan view of an alternative embodiment of a sheet usable with the present invention and having scallops on one side of the longitudinal axis L and having a convex/concave shape with rectilinear sides on the other side of the longitudinal axis L.

Referring to FIG. 4, if desired, each longitudinal edge of one or more sheets 12 may be concave, providing a sheet 12 referred to as concave. If the tow fiber layer 14 is of constant width, this arrangement provides a differential overhang DO which is relatively greater as either transverse edge is approached and relatively lesser as the transverse axis T is approached. This arrangement provides the advantage that the relatively lesser differential overhang DO near the center of the cleaning article 10 may provide relatively greater fluffing of the tow fibers near the transverse edges 22 of the article.

If desired, the cleaning article 10 may have a notch which is arcuate and has a radius of curvature which increases as the transverse axis T is approached. This arrangement provides for a more rapid change in the amount of fluffing incurred. In a nonlimiting example, for the embodiment described herein having a length ranging from 140 to 200 mm and a transverse width ranging from 90 to 130 mm, the differential overhang DO may range from 4 to 60 mm, from 5 to 50 mm or from 10 to 30 mm at various positions along the longitudinal edges 20.

In yet another embodiment, the cleaning article 10 may comprise a first sheet 12 having respective first sheet 12 longitudinal edges 20 with a first sheet 12 geometry. The cleaning article 10 may further comprise a second sheet 12 having respective second sheet 12 longitudinal edges 20 and a respective second sheet 12 geometry. The first sheet 12 geometry and second sheet 12 geometry may be different, so that the first sheet 12 longitudinal edges 20 and second sheet 12 longitudinal edges 20 are not identically disposed outward from the longitudinal axis L. This arrangement provides the benefit that the differential overhang DO associated with each sheet 12 provides for differential and potentially greater fluffing.

In yet another embodiment, the longitudinal edges 20 of the sheet 12 may be serrated. The serrations may be of identical, similar and/or different pitch and or depth. The serrations may be sawtooth, square, sinusoidal, etc. and/or any combination thereof.

Referring to FIG. 3 in another embodiment, the sheet 12 longitudinal edges 20 of the one or more sheets 12 may be straight and parallel. Conversely, the tow fiber layer 14 longitudinal edges 20 may be curved, notched, concave, convex, etc. to differentially overhang the longitudinal edges 20 of said sheet 12. This arrangement provides the benefit that regularly shaped sheets 12 may be utilized and the tow fiber layer 14 width varied to provide the differential overhang DO.

The tow fiber layer 14 may be concave as described above with respect to the sheet 12 or may be convex as likewise described above with respect to sheet 12. Alternatively, the tow fiber layer 14 may monotonically increase or monotonically decrease in width, and in respective corresponding differential overhang DO, as either transverse edge is approached. This arrangement provides the benefit that fluffing may be controlled as a function of the longitudinal position. Conversely, the tow fibers may be randomly arranged to provide a cleaning article 10 wherein said the differential overhang DO occurs randomly throughout said longitudinal length.

If desired, in yet another embodiment, the cleaning article 10 according to the present invention may comprise tow fiber layers 14 having plural decitex values. Particularly, in a nonlimiting example a single tow fiber layer 14 may comprise plural decitex values. Additionally or alternatively, each tow fiber layer 14 may comprise a single decitex value, but different tow fiber layers 14 may have mutually different decitex values.

The decitex values may range from about 1 to about 30, and ratio of decitex values may range from 1.5:1 to 5:1. If desired the layer of tow fibers having a higher decitex value may be placed relatively closer to the top layer of tow fibers, and the layer of tow fibers having a lower decitex value may be placed relatively closer to the target surface being cleaned.

In yet another embodiment, the cleaning article 10 may comprise a first tow fiber layer 14 having a respective first tow fiber layer 14 longitudinal length taken in the transverse direction. This cleaning article 10 may further comprise a second tow fiber layer 14 having a respective second tow fiber layer 14 longitudinal length. The first tow fiber layer 14 longitudinal length may be different than the second tow fiber layer 14 longitudinal length.

Referring to FIG. 4, an alternative sheet 12 according to the present invention may have a longitudinal edge 20 comprising plural scallops. The scallops may be of different depth and width, as shown or may be of identical geometry. Alternatively or additionally such a sheet 12 may comprise a concave or convex shape made of rectilinear sides 20, 22. Any of these geometries will provide a differential overhang DO of the tow fiber layer 14 relative to the sheet(s) 12.

Alternatively or additionally, the transverse edges 22 of the sheet(s) 12 may be of variable distance from the transverse axis T. If used with a tow fiber layer 14 of constant distance from the transverse axis T this arrangement provides differential overhang DO of the tow fiber layer 14 relative to the sheet(s) 12 at the proximal transverse edge 22, and particularly the distal transverse edge 22 of the cleaning article 10.

Figure 5:
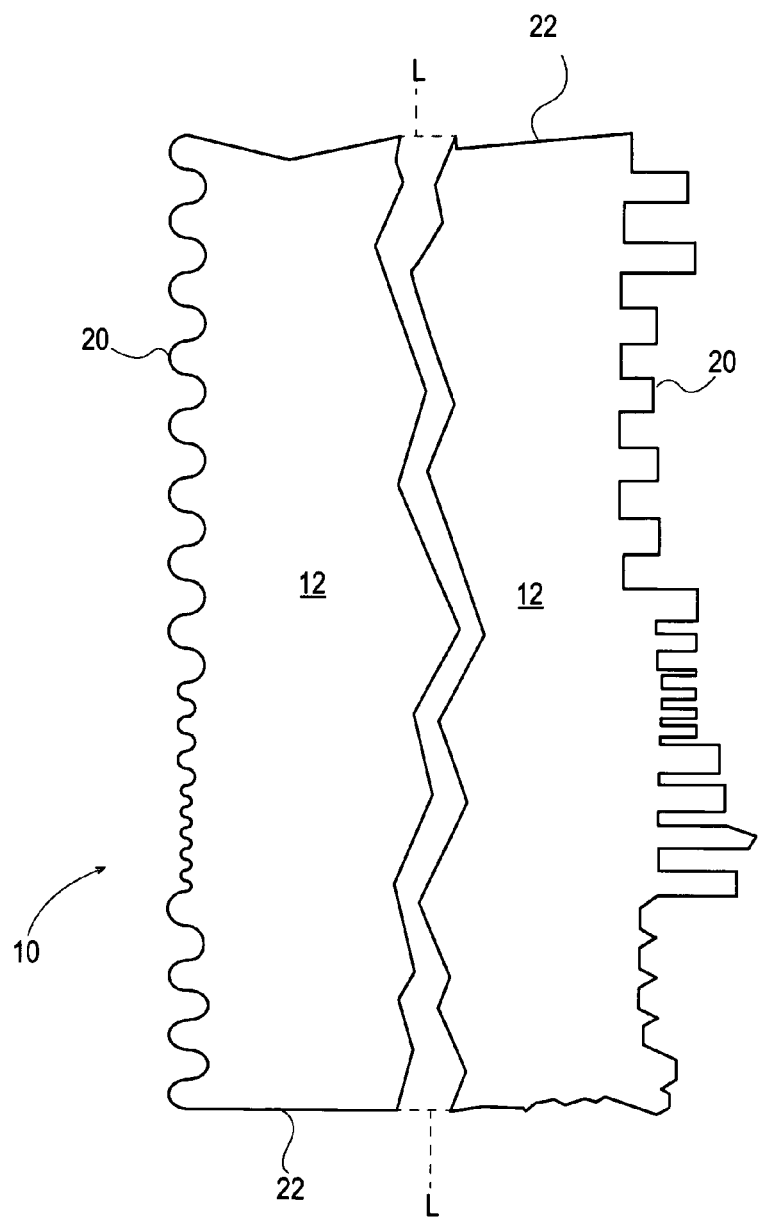
FIG. 5 is a broken top plan view of an alternative embodiment of a tow fiber layer usable with the present invention and having notches on one side of the longitudinal axis L and having a sinusoidal edge on the other side of the longitudinal axis L.

Referring to FIG. 5, an alternative tow fiber layer 14 according to the present invention may have a longitudinal edge 20 comprising plural notches. The notches may be of different depth and width, as shown or may be of identical geometry. Alternatively or additionally such a tow fiber layer 14 may comprise a sinusoidal longitudinal edge 20. Any of these geometries will provide a differential overhang DO of the tow fiber layer 14 relative to the sheet(s) 12.

Alternatively or additionally, the transverse edges 22 of the tow fiber layer 14 may be of variable distance from the transverse axis T. If used with a sheet 12 of constant distance from the transverse axis T this arrangement provides differential overhang DO of the tow fiber layer 14 relative to the sheet(s) 12 at the proximal transverse edge, and particularly the distal transverse edge of the cleaning article 10.

If desired, the various cleaning articles 10 described herein may be packaged and sold in a kit. Some of the cleaning articles 10 may have the aforementioned concave sheet 12 and other cleaning articles 10 may have a convex sheet 12. This arrangement provides the benefit that the user has a choice of different cleaning articles 10 for different tasks.

Figure 6:
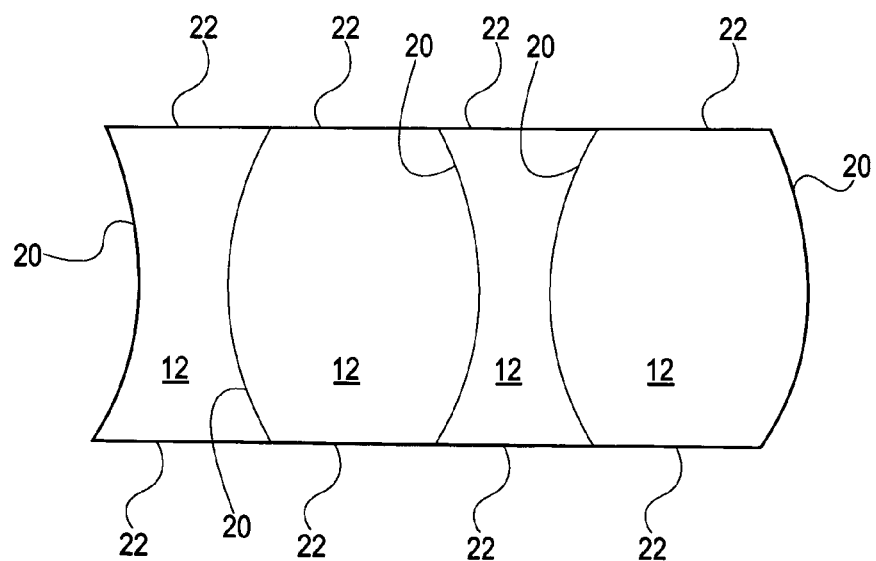
FIG. 6 is a broken top plan view of sheet material usable with the present invention and having four individual nested sheets usable with the present invention.

Referring to FIG. 6, a further unpredicted benefit occurs in manufacture. Convex and concave sheets 12 may be nested and cut from a single larger piece of material. As individual sheets 12 are cut from the larger material, waste is minimized due to the nesting.

One of skill will recognize that hybrids and combinations of the embodiments described above are contemplated and feasible. For example, any of the sheets 12 described herein may be used with any of the tow fiber layers 14 described herein. A single cleaning article 10 may comprise plural sheets 12 having like or different geometries and/or plural tow fiber layers 14 having like or different geometries. Such sheets 12 and tow fiber layers 14 may be disposed next to each other, interspersed or placed in any desired configuration of layers.

Further, any of the embodiments described herein may optionally include any one of, any combination of, or all of: a sheet 12 and/or tow fiber layer 14 having differential overhang DO, a sheet 12 with apertures, an elastically contracted sheet 12 and/or a cleaning article 10 having an elastically contracted upstanding panel, as shown in commonly assigned P&G Cases 12382, 12383, 12384 and 12385, respectively. All such variant embodiments are described in these four aforementioned commonly assigned patent applications, all filed Mar. 9, 2012.

Any of the sheet 12 and/or layer of tow fibers 14 may be completely or partially coated with adhesive, wax, Newtonian or non-Newtonian oils or a combination thereof, in order to improve cleaning and increase retention of absorbed debris. If desired, the cleaning article 10 may optionally be used with a cleaning solution or other solution usable for other purposes such as treating the surface for appearance or disinfectant, etc. The cleaning solution may be pre-applied to the cleaning article 10, creating a pre-moistened cleaning article 10 or may be contained within a separate reservoir for dosing onto the cleaning article 10 and/or target surface. The cleaning solution may comprise a majority water, and at least about 0.5, 2, 5 or 10% solids, or at least about 30% or 50% aqueous solvents, non-aqueous solutions or mixtures thereof (all by weight).

Optionally the cleaning article 10 may further comprise a non-planar structure, as disclosed in commonly assigned US publication 2011/0131746 A1, filed Dec. 4, 2009. The non-planar structure may extend out of the XY plane, in the z-direction.

Referring back to FIG. 1, the cleaning article 10 may optionally further comprise gather strips 17, as known from the prior art. As used herein, gather strips 17 refer to cantilevered elements extending transversely outwardly from the longitudinal centerline of the article 10, and having a length (taken in the transverse direction) greater than the corresponding width (as taken in the longitudinal direction). The gather strips 17 lie within the XY plane as intended by manufacture, although may be deformed out of the XY plane due to fluffing before use, and/or deformations which occur in use due to movement against the target surface. The gather strips 17 may be incorporated into one of the sheets 12 described above or may be deployed on a separate sheet 12.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article for optional removable attachment to a handle and having a longitudinal axis defining a longitudinal length and a transverse axis orthogonal thereto, said cleaning article comprising:
at least one layer of tow fibers, said tow fibers extending transversely outward from proximal ends juxtaposed with said longitudinal axis to distal ends transversely remote therefrom, said layer further having first and second opposed faces and defining a tow fiber width from said spine to said distal ends of said fibers; and
a generally planar sheet disposed on said first face of said at least one layer of tow fibers, said sheet having a sheet width, said sheet width being predominantly less than said tow fiber width, so that said distal ends of said tow fibers differentially overhang the edges of said sheet along a predominant portion of said longitudinal length and wherein said differential overhang of said tow fibers monotonically increases or decreases in the longitudinal direction as said transverse axis is approached, and said cleaning article optionally comprising transversely extending gather strips.

2. A cleaning article according to claim 1 wherein said cleaning article is symmetric about said longitudinal axis.

3. A cleaning article according to claim 2 wherein said differential overhang occurs throughout said longitudinal length.

4. A cleaning article according to claim 3 wherein said cleaning article has a transverse axis and is symmetric about said transverse axis.

5. A cleaning article according to claim 2 wherein said generally planar sheet comprises a first sheet and further comprising a second sheet joined to said first sheet to form at least one longitudinally oriented sleeve therebetween for receiving a fork tine therein.

6. A cleaning article according to claim 5 further comprising a third sheet joined to said second face of said tow fibers, said third sheet optionally comprising laterally extending gather strips.

7. A cleaning article for optional removable attachment to a handle and having a longitudinal axis defining a longitudinal length, said cleaning article comprising:
at least one layer of tow fibers, said tow fibers extending transversely outward from proximal ends juxtaposed with said longitudinal axis to distal ends transversely remote therefrom, said layer further having first and second opposed faces and defining a tow fiber width;

a generally planar sheet disposed on said first face of said at least one layer of tow fibers, said sheet having a sheet width between two opposed longitudinal edges, said sheet width being predominantly less than said tow fiber width, wherein said sheet width is nonconstant predominantly throughout the longitudinal length of said sheet, at least one of said longitudinal edges having a notch therein, said notch intercepting at least half of said at least one longitudinal edge of said sheet.

8. A cleaning article according to claim 7 symmetric about said longitudinal axis, wherein said cleaning article has a transverse axis, each said longitudinal edge of said sheet being notched to be concave.

9. A cleaning article according to claim 8 wherein said notch is arcuate and has a radius of curvature which increases as said transverse axis is approached.

10. A cleaning article according to claim 9 wherein distal ends of said tow overhang said longitudinal edges of said sheet from about 5 to about 50 mm.

11. A cleaning article according to claim 10 wherein said generally planar sheet comprises a first sheet having first sheet longitudinal edges, said cleaning article further comprising a second sheet having respective second sheet longitudinal edges and joined to said first sheet, said first sheet longitudinal edges and said second sheet longitudinal edges not being identically disposed outwardly from said longitudinal axis.

12. A cleaning article according to claim 10 wherein said differential overhang occurs throughout said longitudinal length.

13. A cleaning article for optional removable attachment to a handle and having a longitudinal axis defining a longitudinal length, said cleaning article comprising:

at least one layer of tow fibers, said tow fibers extending transversely outward from proximal ends juxtaposed with said spine to distal ends transversely remote therefrom, said layer further having first and second opposed faces and defining a tow fiber width, said tow fiber width varying throughout said longitudinal length;

a generally planar sheet disposed on said first face of said at least one layer of tow fibers, said sheet having a two opposed longitudinal edges, said tow fibers differentially overhanging said longitudinal edges of said sheet.

14. A cleaning article according to claim 13 wherein said differential overhang occurs randomly throughout said longitudinal length of said article.

15. A cleaning article according to claim 14 wherein said layer of tow fibers comprises tow fibers having plural decitex values.

16. A cleaning article according to claim 15 wherein plural decitex values range from 1 to 30.

17. A cleaning article according to claim 13 wherein said tow layer comprises a first tow layer having a respective first tow layer longitudinal length, said cleaning article further comprising a respective second tow layer longitudinal length, said first tow layer longitudinal length being different than said second tow layer longitudinal length.

18. A cleaning article according to claim 17 wherein said second tow layer longitudinal length is less than said first tow layer longitudinal length.

\* \* \* \* \*